United States Patent [19]

Kushimoto et al.

[11] Patent Number: 4,818,808
[45] Date of Patent: Apr. 4, 1989

[54] PROCESS FOR PRODUCING POLYESTERS USING A NIOBIUM COMPOUND AS A CATALYST

[75] Inventors: Toshihiro Kushimoto, Osaka; Yoshimichi Ozawa; Nobuo Izawa, both of Hofu, all of Japan

[73] Assignees: Kanebo, Ltd., Tokyo; Research Association for Synthetic Fiber Technology, Osaku, both of Japan

[21] Appl. No.: 173,188

[22] Filed: Mar. 24, 1988

[30] Foreign Application Priority Data

Apr. 22, 1987 [JP]  Japan .................................. 62-99257
Aug. 24, 1987 [JP]  Japan .................................. 62209573
Dec. 24, 1987 [JP]  Japan .................................. 62-327947

[51] Int. Cl.$^4$ .............................................. C08G 63/04
[52] U.S. Cl. .................................... 528/275; 528/277; 528/279; 528/283; 528/286; 528/308; 528/308.6; 524/700; 524/706; 524/783; 524/784; 524/796
[58] Field of Search ............... 528/275, 277, 279, 283, 528/286, 308, 308.6; 524/700, 706, 783, 784, 796

[56] References Cited

U.S. PATENT DOCUMENTS

| | | | |
|---|---|---|---|
| 3,127,375 | 3/1964 | Keck | 528/277 |
| 3,758,438 | 9/1973 | Freitag | 524/780 |
| 3,936,421 | 2/1976 | Hayashi et al. | 524/707 |
| 4,205,157 | 5/1980 | Duh | 528/272 |
| 4,365,031 | 12/1982 | Massey et al. | 524/88 |
| 4,374,949 | 2/1983 | Massey et al. | 524/720 |
| 4,435,562 | 3/1984 | Sullivan et al. | 528/272 |
| 4,469,747 | 9/1984 | Sasaki et al. | 428/325 |
| 4,496,704 | 1/1985 | Ginnings | 528/26 |
| 4,766,181 | 8/1988 | Ostrozynski et al. | 428/395 |

*Primary Examiner*—John Kight
*Assistant Examiner*—S. A. Acquah
*Attorney, Agent, or Firm*—Flynn, Thiel, Boutell & Tanis

[57] ABSTRACT

A process for producing a linear polyester comprising a main structural unit of an aromatic dicarboxylic acid ester of an alkylene glycol, particularly, comprising a polyethylene terephthalate or polytetramethylene terephthalate unit, is provided. In the process of the invention, the polycondensation reaction is conducted in the presence of a niobic acid catalyst that is obtained by heat-treating a hydrated niobium compound at the temperature range between 80° C. and 400° C. The process of the invention is also effecitvely applied to the manufacture of an elastomeric polyester comprising a polyalkylene terephthalate as a hard segment and a polyalkylene glycol as a soft segment.

15 Claims, No Drawings

PROCESS FOR PRODUCING POLYESTERS USING A NIOBIUM COMPOUND AS A CATALYST

BACKGROUND OF THE INVENTION

1. Field of the Invention

The present invention relates to processes for producing linear polyesters comprising a main structural unit of an aromatic dicarboxylic acid ester of an alkylene glycol and polyester elastomers comprising a polyalkylene terephthalate as a hard segment and a polyalkylene glycol as a soft segment.

2. Description of the Prior Art

The most important linear polyesters amongst those currently under industrial manufacture are polyalkylene terephthalates represented by polyethylene terephthalate and polytetramethylene terephthalate which have been utilized extensively for fibers, films and other shaped articles.

Further, elastomeric polyesters, inter alia, polytetramethylene terephthalate elastomers, are being utilized extensively in the uses for automotive parts, electric and electronic parts, etc., by virtue of excellence in oil resistance, chemical resistance, availability in a wide temperature range, load bearing properties and resistance to flexural fatigue as compared with other thermoplastic elastomers. Namely, the polytetramethylene terephthalate units constituting hard segments provide the elastomers with a high melting point and high crystallinity, while the polyalkylene glycol units constituting soft segments are extremely low in glass transition temperature. Consequently, the elastomers maintain flexibility and strength in a wide temperature range from a low temperature to a high temperature. Furthermore, their mechanical properties such as tenacity, elongation or the like and chemical properties such as oil resistance, chemical resistance or the like can be adjusted by varying proportion of the two units depending on the purposes and uses.

The polyalkylene terephthalates are usually obtained by a two stage reaction. On the first stage, a transesterification reaction of dimethyl terephthalate and an alkylene glycol is effected by heating at 150°~240° C. in the presence of a catalyst, removing producing methanol, or a direct esterification reaction of terephthalic acid with an alkylene glycol is effected, to produce a precondensate, bis(hydroxyalkyl)terephthalate. On the second stage, the precondensate undergoes polycondensation with a deglycol reaction. In this case, the polycondensation is conducted at a temperature above the melting point of the polyalkylene terephthalate under a reduced pressure, or the precondensate is once cooled to solidify, pulverized into powder or particles of an appropriate size and then undergoes a solid phase polymerization at a temperature below the melting point of the polyalkylene terephthalate under a reduced pressure or an inert gas stream. In order to promote these reactions smoothly, catalysts have generally been employed and it has been known that not only the reaction rate but also the color shade and heat stability of the resultant polyesters largely depend upon the kind of catalysts employed.

Accordingly, it is extremely important to provide catalysts having good performances such as to yield, at a high reaction rate, polyesters having a good color shade and exhibiting an excellent heat stability. Therefore, a host of catalysts for polycondensation which are suitable for the manufacture of linear polyesters having a high polymerization degree have so far been proposed.

With respect to metallic niobium or niobium compounds catalysts, there are disclosed: in U.S. patent specification No. 3,127,375, a process for preparing a polyester using a niobium compound such as niobium pentoxide or the like as a catalyst for polycondensation; in U.S. patent specification No. 3,758,438, a process for the manufacture of fibers from polyesters having a metallic golden shade wherein niobium pentoxide hydrate having a water content from 5~25% is added during esterification and polycondensation or transesterification and polycondensation in the formation of polyesters; in U.S. Pat. No. 4,365,031, a process for producing polyester articles having a green shade wherein a yellow colorant, i.e., niobium compound, is employed as a catalyst for esterification and/or polycondensation and then a blue pigment is added; in Japanese Pat. Application Publication No. 8,225/1972, a process for polycondensation of polyesters by using metallic niobium as a catalyst; in Japanese Patent Application Publication No. 40,310/1970, a process wherein a completely hydrolyzed product of niobium pentahalide is used as a catalyst for polycondensation; in Japanese Patent Application Publication No. 12,153/1971, a process wherein an aromatic oxide of niobium is employed as a catalyst for polycondensation; in Japanese Patent Application Laid-open No. 56-20,027, a process for preparing polyethylene terephthalate wherein a trace of an ethylene glycol soluble niobium compound is incorporated into other catalysts for polycondensation; etc.

However, as a result of detailed studies, these hitherto proposed niobium catalysts have proved to be not always satisfactory in respect of the effect for reaction promotion or solubility in reaction system of the catalysts. Particularly in the case of polyethylene terephthalate, there is encountered a difficulty such that color development of the products is so manifest that the article value is impaired.

Furthermore, a process for manufacturing polytetramethylene terephthalate by direct polymerization of terephthalic acid with 1,4-tetramethylene glycol as well as a manufacturing process through transesterification of dimethyl terephthalate and 1,4-tetramethylene glycol, consists of a first stage reaction wherein terephthalic acid and 1,4-tetramethylene glycol are subjected to an esterification reaction to produce bis(4-hydroxybutyl)tetephthalate and its oligomers and a second stage reaction wherein these are further polycondensed. On the second stage of such a manufacturing process, in the absence of catalysts for polycondensation, the reaction is extremely retarded and viscosity of the condensates does not rise higher than a certain extent. Namely, in order to promote the polycondensation to attain a viscosity that is required for objective fibers or resins, catalysts such as organic titanium compounds, organic tin compounds or the like have generally been added.

Meanwhile as a manufacturing process of the above mentioned elastomeric polyesters, there is generally known a process wherein an esterification reaction of terephthalic acid, ethylene glycol or 1,4-tetramethylene glycol and a polyalkylene glycol is conducted, followed by a polycondensation reaction, or after the estrification reaction of the former two reactants, the polyalkylene glycol is incorporated to the reaction system and subsequently the polycondensation reaction is conducted.

In such a process, difficulties are also encountered that the polyalkylene glycol used as a material for the soft segment is so susceptible to thermal decomposition at high temperatures or the polymerization at low temperatures requires such a long time that it is hard to obtain polymers having an aimed viscosity. As measures therefor, there have been proposed a method of using organic titanium catalysts in Japanese Patent Application Publication No. 31,558/1974 and a method of combined use of organic titanium catalysts with aromatic aldehyde acid in Japanese Patent Application Publication No. 29,096/1980.

However, as a result of detailed studies of those methods of using organic titanium catalysts, it has been found that these catalysts have a drawback of being denatured and deactivated due to water present in the reaction system. Namely, they are not satisfactory because, on the one hand, if they are used in an amount sufficient to promote the reaction, a turbidity appears due to the denaturing and precipitating of the organic titanium so that opaque polymers are obtained and, on the other hand, if used in a reduced amount, the reaction time is so much prolonged that the decomposition of the polyalkylene glycol components increases. Further, it has also been found that the use of organic tin compounds is involved in a problem of color development of the resulting polymers.

Therefore, we, the inventors, as a result of an assiduous research to seek excellent catalysts for polycondensation of liner polyesters, have found that specified niobium compounds soluble in the reaction mixture can shorten the reaction time astonishingly and provide the resulting polymers with satisfactory properties, and thus accomplished the present invention.

SUMMARY OF THE INVENTION

An object of the present invention is to provide a process for manufacturing, with remarkably a shortened reaction time, linear polyesters having a good color shade, an excellent heat stability and satisfactorily a high polymerization degree.

Another object of the present invention is to obtain elastomeric polyesters of high quality with economical advantages using a catalyst that is never deactivated due to water present in the reaction system, shortening the time of polycondensation reaction simultaneously restraining the production of by-products.

The process to achieve the above-mentioned object in the manufacture of polyesters comprising a main structural unit of an aromatic dicarboxylic acid ester of an alkylene glycol through polycondensation by a deglycol reaction of a bis alkylene glycol ester of the aromatic dicarboxylic acid, is characterized in that a niobic acid obtained by heat-treating a hydrated niobium compound at the temperature range between 80° C. and 400° C. is used as a catalyst for polycondensation.

The process of the present invention is particularly effective when said aromatic dicarboxylic acid is terephthalic acid and said alkylene glycol is ethylene glycol.

The process of the present invention particularly exerts its meritorious effect when said hydrated niobium compound has been obtained by treating a niobium halide with an alkaline aqueous solution that contains not exceeding 45 mole %, preferably 10–40 mole %, of ammonium hydroxide based on the total alkali components in the alkaline aqueous solution.

It is preferred that phosphoric acid is used in combination with said catalyst in a proportion defined by the following equation (I):

$$Nb/P = 0.1 \sim 10 \tag{I}$$

wherein Nb represents the weight of the niobic acid catalyst and P represents the weight of the phosphoric acid.

The process of the present invention particularly will exert its prominent effect when said aromatic dicarboxylic acid is terephthalic acid and said alkylene glycol is 1,4-tetramethylene glycol.

In this case, it is preferred that at least one organic metallic compound selected from the group consisting of organic titanium compounds and organic tin compounds is used as a catalyst for esterification and the process of the present invention is applied on the polycondensation stage.

The above-mentioned catalyst is applied preferably in such an amount that $0.0005 \sim 0.5\%$ by weight of metallic niobium exists in the produced polymer.

The above-mentioned catalyst contains an effective component represented by the following chemical formula:

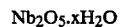

wherein,
$0 < x < 1$.

Further, the process of the present invention is preferably applied to the manufacture of elastomeric polyesters from polyalkylene terephthalates and polyalkylene glycols.

As the above polyalkylene terephthalates, the most important are polyethylene terephthalate and polytetramethylene terephthalate. As the above polyalkylene glycol, one of the most important is polytetramethylene glycol.

DETAILED DESCRIPTION OF THE INVENTION

The niobic acid to be employed in the process of the present invention is obtained by heat-treating a hydrated niobium compound at the temperature range between 80° C. and 400° C. The above hydrated niobium compound is obtainable according to a well-known method, for example, described in "New edition: Inorganic Chemistry" written by Toshizo Chitani, published by Sangyo Tosho K.K. (1977), namely, a niobic acid salt is subjected to alkali fusion followed by extraction with warm water, then a strong acid such as sulfuric acid or the like is added to make the aqueous solution acidic, and the resulting precipitates are isolated and washed.

The temperature for heat-treating the hydrated niobium compound is desired to be 80° C.~400° C., preferably 100° C.~300° C. If it is lower than 80° C., the development of the function to promote the reaction is insufficient, while, if in excess of 400° C., the catalyst becomes hardly soluble in the reaction system so that the effect of promotion of the reaction also becomes insufficient.

When the hydrated niobium compound is heat-treated, the heat treatment is desired to be conducted under an inert gas atmosphere or under a reduced pressure. In air, there may be the case where the niobic acid is colored and denatured though the causes are unknown.

Additionally, when the niobic acid is obtained through a heat treatment as mentioned above of a niobium compound which has been prepared by treating a niobium halide with an alkaline aqueous solution that contains not more than 45 mole %, preferably 10 mole %~40 mole %, based on the total alkali components, of ammonium hydroxide and when this niobic acid is employed as a catalyst for polycondensation of polyethylene terephthalate, substantially colorless polymers are provided.

Thus, the above niobic acid according to the present invention remarkably increases the reaction rate so that it can be used as an effective catalyst for polycondensation. Of course it is effectively used alone and, however, if used in combination with phosphoric acid with a proportion as defined by the equation below, it exerts an excellent effect as a catalyst for polycondensation particularly of polyethylene terephthalate and can provide substantially colorless polymers:

$$Nb/P = 0.1 \sim 10 \quad (I)$$

wherein Nb represents the weight of niobic acid used as a catalyst and P represents the weight of the phosphoric acid.

The niobic acid according to the present invention requires no special care for handling in the open atmosphere when it is used and exhibits a high activity o without being denatured and deteriorated by water.

Though the reason why the heat-treated niobic acid exhibits a conspicuous, high effect of reaction promotion has not been elucidated, it is conjectured that, according to Japanese Patent Application Laid-open No. 60-44,039 and "Surface", vol. 23 (1985), pp. 39~49, a niobic acid such as heated at a low temperature has numerous acidic sites with a strong acidity that exhibit an acidity function of solid acid, $H_0$, of not more than −5.6 (equivalent to the acidity of 70% $H_2SO_4$) and these acidic points function as reaction activating points of the catalyst.

The niobic acid catalyst comprises an isopolyacid, as an effective component, represented by the chemical formula, $Nb_2O_5 \cdot xH_2O$ wherein $0 < x < 1$, that is formed through the heat treatment. In the process of the present invention, since the niobic acid catalyst is uniformly dispersed in the reaction liquid, resulting in transparent polymers, it can be explained that the catalyst preserves its specific structure even in the polymers, to which the effect of the reaction promotion is attributed.

Any conditions usually employed in the polycondensation reaction may be adopted, but the reaction temperature is preferred to be 200°~290° C.

Though the amount of the catalyst used in the manufacture of the polyesters according to the process of the present invention depends on the reaction conditions, generally the catalyst is added in such an amount that 0.0005~0.5%, preferably 0.005~0.05%, by weight of metallic niobium exists in the finally obtained polyester polymers. Alternatively, the amount of the catalyst used in the manufacture of the elastomeric polyesters also depends on the reaction conditions, it is added in such an amount that 0.0001~0.1%, preferably 0.001~0.05%, by weight of metallic niobium exists in the elastomeric polyesters.

The catalyst according to the present invention is preferably added after the transesterification or esterification reaction or during the polycondensation reaction, though it may be added before those reactions. Further, a divided aliquot can be added right before the polycondensation reaction.

Particularly in the case where polytetramethylene terephthalate is manufactured, if at least one organic metallic compound selected from the group consisting of organic titanium compounds and organic tin compounds is used as a catalyst for esterification and the niobic acid catalyst according to the present invention is applied as a catalyst for polycondensation, polymers having substantially no color and no turbidity can be obtained.

Further, in the process of the present invention, the niobic acid catalyst may be used in combination with various known catalysts: for example, manganese, magnesium, calcium, cobalt and zinc compounds; tin compounds such as dibutyltin oxide, monobutyltin oxide or the like; titanium compounds such as tetra-n-butyl titanate, potassium titanate oxalate or the like; antimony compounds such as antimony trioxide, antimony acetate or the like; and germanium oxide or the like.

The process of the present invention can be effectively applied in the cases where the polyesters are produced from aromatic dicarboxylic acids mainly comprising terephthalic acid as the main acidic components and alkylene glycols as the main glycolic components and where elastomeric polyesters having hard segments being composed of polyalkylene terephthalate are manufactured. In the above cases, typical glycols are ethylene glycol and 1,4-tetramethylene glycol, which also can be applied in the manufacture of copolyesters that contain at least one kind of third components other than the above terephthalic acid and glycols.

Throughout this specification, the term "mainly" or "main" used in connection with the amount of the components is to be understood to mean an excess of 50 mole % and, therefore, less than 50 mole % of other comonomer may be contained.

In the present invention, the aromatic dicarboxylic acids are compounds having an aromatic ring and carboxylic acids directly bonded therewith, such as terephthalic acid, isophthalic acid, naphthalene dicarboxylic acid, diphenyl dicarboxylic acid, diphenylether dicarboxylic acid or the like. Particularly, terephthalic acid is preferred.

In the present invention, as a copolymerizable third component (less than 50 mole %), mention may be made of aromatic dicarboxylic acids other than the main structural component of this polyester, such as isophthalic acid, p-β-oxyethoxybenzoic acid, diphenylsulfone dicarboxylic acid, diphenylether dicarboxylic acid, diphenoxyethane dicarboxylic acid, 5-sodium-sulfoisophthalic acid or the like; aliphatic dicarboxylic acids, such as oxalic acid, malonic acid, succinic acid, adipic acid, sebacic acid, dodecane dicarboxylic acid or the like; alicyclic dicarboxylic acids, such as hexahydroterephthalic acid, dekalin dicarboxylic acid, tetralin dicarboxylic acid or the like; oxyacids such as glycollic acid, p-oxybenzoic acid or the like; aliphatic diols other than the main structural component of this polyester, such as ethylene glycol, trimethylene glycol, propylene glycol, 1,3-butane diol, neopentyl glycol or the like; alicyclic diols such as cyclohexane dimethanol, tricyclodecane dimethylol or the like; and aromatic diols such as bisphenol A, bisphenol S, bishydroxyethoxybisphenol A, tetrabromobisphenol A or the like.

Further, to the extent that the polyester is regarded as substantially linear, polyfunctional compounds, such as trimellitic acid, trimesic acid, pyromellitic acid, tricarballylic acid, trimethylol propane, glycerin, pentaerythritol or the like, and monofunctional compounds, such as benzoic acid, naphthoic acid, stearyl alcohol, palmitic acid or the like and derivatives thereof, may be added.

Additionally, like ordinary linear polyesters, the polyesters to be manufactured according to the process of the present invention may be added with heat stabilizers such as phosphoric acid ester or the like, shade adjustors such as cobalt phosphate, cobalt acetate or the like, antioxidants such as hindered phenol or the like, UV absorbers such as benzotriazole, hydroxybenzophenone, cyanoacrylate or the like, pigments or dyes such as titanium oxide, carbon black, cobalt blue or the like, nucleators such as talc, wollastonite, mica or the like, crystallization accelerators such as higher fatty acids or the like, release agents, antistatic agents, and the like.

In the elastomeric polyesters, polyalkylene glycols constituting the soft segments are polyethylene glycol, polypropylene glycol, polytetramethylene glycol and copolymers thereof and, in particular, copolyalkylene glycols comprising polytetramethylene glycol as a main ingredient are preferred. The number average molecular weight of the polyalkylene glycols is preferred to be 500~5,000, more preferably 1,000~3,000. If the molecular weight is too high, the polyalkylene glycol is liable to degrade and poor in elasticity at low temperatures. While, those of a low molecular weight are not preferable as the resulting polymers will have a low melting point. Additionally, though the preferable proportion of hard segments to soft segments depends on the use of the elastomers, it is generally 20/1~½ by weight.

The reaction conditions, such as temperatures, pressures, time and the like, for manufacturing the elastomeric polyesters from such starting materials, may be same as conventional including the esterification stage.

The process of the present invention remarkably shortens the time required for polycondensation reactions of polyesters and, moreover, provides the resulting polyesters with an excellent shade as compared with conventional processes. Alternatively, in the case where elastomeric polyesters are manufactured by reacting the polyethylene terephthalate or polytetramethylene terephthalate forming materials with polyalkylene glycol, the process of the present invention can obviate the deactivation of the catalysts due to water, etc. produced in the reaction system, shorten the time for polycondensation reactions and provide elastomeric polyesters of high quality with substantially no turbidity.

The present invention will be further explained in more detail by way of example together with comparative examples, hereinafter. In the examples, the intrinsic viscosity $[\eta]$ was determined in a phenol/tetrachloroethane (60%/40%) mixed solvent at 20° C., with a concentration of 1 g/dl. The percent and part are by weight.

EXAMPLE 1

Ten parts of niobic acid manufactured by CBMM (Companhia Brasileira de Metalurgia e Mineracao, Brazil) were washed 5 times with pure water and then heat-treated at 100° C. for 15 hours. The resultant was used as a catalyst.

A reactor equipped with a fractionating column and a stirrer was charged with 100 parts of terephthalic acid and 45 parts of ethylene glycol, pressurized to 2 $kg/cm^2G$ with nitrogen gas, heated to raise the temperature up to 250° C. for about 2 hours while agitating thoroughly. The heating was continued, removing by-producing water successively out of the reaction system through the fractionating column until 20 parts of water had been distilled out when the first stage reaction was finished.

Then, the reaction product was transferred into a reactor having an internal volume of 300 ml equipped with a vacuumizing device and a stirrer and then 0.03 part of the above catalyst was added. The reactor was immersed in a hot bath heated at 280° C. and, from 10 minutes after the immersion, gradually vacuumized. Maintaining the internal pressure at 1 Torr or less, the reaction was conducted for 0.75 hours. The obtained polymer was extruded from the bottom of the reactor into cold water to be quenched. This polymer had an intrinsic viscosity $[\eta]$ of 0.751 and its appearance was pale yellow and transparent.

EXAMPLES 2~4 AND COMPARATIVE EXAMPLES 1~4

The above Example 1 was followed except that the niobic acid further heat-treated at predetermined temperatures for 2 hours in a nitrogen gas stream was used as a catalyst. The result is shown in Table 1 below. Additionally, Table 1 also shows results of Comparative Examples wherein commercially available niobium pentachloride and niobium oxide were used as the catalyst.

TABLE 1

| | Heat-treating Temperature (°C.) | Intrinsic Viscosity $[\eta]$ | Appearance | Remarks |
|---|---|---|---|---|
| Example 1 | 100 | 0.751 | Pale yellow, transparent | |
| Example 2 | 200 | 0.722 | Pale yellow, transparent | |
| Example 3 | 300 | 0.715 | Pale yellow, transparent | |
| Example 4 | 400 | 0.698 | Pale yellow, transparent | |
| Comparative Example 1 | 60 | 0.237 | Pale yellow, transparent | |
| Comparative Example 2 | 500 | 0.245 | Opaque | |
| Comparative Example 3 | — | 0.221 | Pale yellow, transparent | Niobium pentachloride |
| Comparative Example 4 | — | 0.235 | Opaque | Niobium oxide |

EXAMPLES 5~9

The foregoing Example 1 was followed except that the amount of the niobic acid catalyst added was varied. The results are shown in Table 2 below.

TABLE 2

| | Amount of catalyst added (wt. %) | Intrinsic Viscosity $[\eta]$ | Appearance |
|---|---|---|---|
| Example 5 | 0.001 | 0.582 | Colorless, transparent |
| Example 6 | 0.005 | 0.645 | Colorless, transparent |
| Example 7 | 0.025 | 0.701 | Pale yellow, transparent |
| Example 8 | 0.05 | 0.850 | Pale yellow, |

TABLE 2-continued

| | Amount of catalyst added (wt. %) | Intrinsic Viscosity [η] | Appearance |
|---|---|---|---|
| Example 9 | 0.2 | 0.685 | transparent brown, transparent |

EXAMPLES 10~12

Ten parts of water were added with 1 part of commercially available noibium chloride (NbCl5, purity: 95%) and each 5 parts of various hydrolyzing agents (alkali hydroxides). By Stirring, the mixture turned to a colloidal solution. Into the solution, 1N hydrochloric acid was dropped slowly to bring the pH to 1. Then deposited precipitates were isolated by decantation, repeatedly washed with pure water and, when the washing water became neutral, heat-treated at 100° C. for 2 hours. Using the resultant as a catalyst, polycondensation was conducted in the same manner as the foregoing Example 1. The results are shown in Table 3 below.

TABLE 3

| | Hydrolyzing agent | Intrinsic Viscosity [η] | Appearance |
|---|---|---|---|
| Example 10 | NaOH | 0.754 | Pale yellow, transparent |
| Example 11 | KOH | 0.723 | Pale yellow, transparent |
| Example 12 | Ca(OH)2 | 0.685 | Pale yellow, transparent |

EXAMPLES 13~16 AND COMPARATIVE EXAMPLES 5 AND 6

One tenth part of niobium pentachloride powder was transferred from a reagent bottle to a 50 ml Erlenmeyer flask that was filled with nitrogen gas. Into this flask, 2~5 parts of a solution obtained by mixing 1N ammonia water with 1N sodium hydroxide aqueous solution with a predetermined proportion were dropped slowly to bring the supernatant liquid to neutral or alkaline side. In every case excepting that the concentration of the alkali hydroxide was too high, white flock appeared and white precipitate was obtained. The precipitate was centrifugalized, washed several times with water and then heat-treated at 100° C. for 4 hours. The resultant was used as a catalyst. As a colloidal dispersion was formed when the concentration of the alkali hydroxide was high, a dilute hydrochloric acid was dropped to bring the pH to 1 where precipitate was formed. This precipitate was isolated and heat-treated in the same manner as the above.

A four-necked flask equipped with a stirrer was charged with 0.025 part of the thus obtained catalyst and 120 parts of bis(hydroxyethyl)terephthalate. The flask was immersed in a salt bath at 280° C. and, from 10 minutes after the immersion, gradually vacuumized. Maintaining the internal pressure at 1 Torr or less, the reaction was conducted for 50 minutes. The obtained polymer was extruded from a nozzle at the bottom of the reactor into cold water to be quenched. Test results on the polymer samples are shown in Table 4 below. As is clear from Table 4, it is demonstrated that, when the ammonia water is used in an appropriate amount to treat the niobium compound, the resulting niobic acid catalyst can yield polymers having a good color shade, restricting color development of the polymers and, when the ammonia water used is in a certain high concentration or 100% ammonia based on the total alkali components, the polymerization rate too much decreases to yield polymers within an economical period of time.

TABLE 4

| | NH4OH/NaOH ratio | Polymer Intrinsic Viscosity [η] | Appearance |
|---|---|---|---|
| Example 13 | 0/10 | 0.710 | Pale yellow |
| Example 14 | 2/8 | 0.735 | Slightly pale yellow |
| Example 15 | 3/7 | 0.621 | Slightly pale yellow |
| Example 16 | 4/6 | 0.481 | Slightly pale yellow |
| Comparative Example 5 | 5/5 | 0.285 | — |
| Comparative Example 6 | 10/0 | 0.221 | — |

EXAMPLE 17

The foregoing Example 13 was followed except that 0.025 part of the niobic acid prepared in Example 1 together with 0.02 part of phosphoric acid were used as the catalyst. The obtained polymer was good, having a slightly pale yellow shade and an intrinsic viscosity of 0.631.

EXAMPLE 18

The niobic acid prepared in the foregoing Example 1 was used as a catalyst.

A reactor was charged with 340 parts of a precondensate of terephthalic acid and 1,4-tetramethylene glycol together with 0.125 part of the above niobic acid catalyst and gradually vacuumized, while being heated up to 250° C., until a degree of vacuum of 1 Torr or less was finally reached, whereunder a polycondensation reaction was conducted for 3 and a half hours. The obtained polymer had an intrinsic viscosity of 0.910.

EXAMPLES 19~21 AND COMPARATIVE EXAMPLES 7 AND 8

The above Example 18 was followed except that the niobic acid further heat-treated at predetermined temperatures for 2 hours in a nitrogen gas stream was used as a catalyst. The result is shown in Table 5 below. Additionally, Table 5 also shows results of Comparative Examples wherein commercially available niobium pentachloride and niobium oxide were used as a catalyst.

TABLE 5

| | Heat-treating Temperature (°C.) | Intrinsic Viscosity [η] | Appearance | Remarks |
|---|---|---|---|---|
| Example 18 | 100 | 0.910 | Colorless, transparent | |
| Example 19 | 200 | 0.881 | Colorless, transparent | |
| Example 20 | 300 | 0.945 | Colorless, transparent | |
| Example 21 | 400 | 0.902 | Colorless, transparent | |
| Comparative Example 7 | — | 0.221 | Pale yellow, transparent | Niobium pentachloride |

TABLE 5-continued

| | Heat-treating Temperature (°C.) | Intrinsic Viscosity [η] | Appearance | Remarks |
|---|---|---|---|---|
| Comparative Example 8 | — | 0.235 | Opaque | Niobium oxide |

EXAMPLES 22~26

The foregoing Example 18 was followed except that the amount of the niobic acid catalyst added was varied. The results are shown in Table 6 below.

TABLE 6

| | Amount of catalyst added (wt. %) | Intrinsic Viscosity [η] | Appearance |
|---|---|---|---|
| Example 22 | 0.001 | 0.428 | Colorless, transparent |
| Example 23 | 0.005 | 0.549 | Colorless, transparent |
| Example 24 | 0.025 | 0.851 | Colorless, transparent |
| Example 25 | 0.05 | 0.921 | Colorless, transparent |
| Example 26 | 0.2 | 0.907 | Pale yellow, transparent |

EXAMPLE 27

A reactor equipped with a fractionating column was charged with 166 parts of terephthalic acid, 153 parts of 1,4-tetramethylene glycol, 0.08 part of tetra-n-butyl titanate as a catalyst for esterification, and 0.125 part of the niobic acid prepared in the foregoing Example 1 as a catalyst for polycondensation. The esterification reaction was conducted at 220° C., distilling out producing water.

The time required for the terephthalic acid to dissolve (esterification reaction time) was 1 hour and 25 minutes. The tetrahydrofuran content in 53.9 g distilled-out liquid was 12.5 g. Then, this reaction product was transferred to a polycondensation reactor, gradually vacuumized, while being heated up to 250° C., until a degree of vacuum of 1 Torr or less was finally reached, whereunder a polycondensation reaction was conducted for 2 and a half hours. The obtained polymer was colorless with little turbidity and had an intrinsic viscosity of 0.81.

EXAMPLE 28

The above Example 27 was followed except that 0.05 part of mono-n-butyltin oxide was used instead of tetra-n-butyl titanate. The obtained polymer had little turbidity and an intrinsic viscosity of 0.75.

COMPARATIVE EXAMPLE 9

The foregoing Example 27 was followed except that the niobic acid catalyst was not added. The obtained polymer had an appreciable turbidity and an intrinsic viscosity of 0.68.

EXAMPLE 29

A reactor equipped with a vacuumizing device and a stirrer, charged with 340 parts of the precondensate of terephthalic acid and 1,4-tetramethylene glycol, 100 parts of polytetramethylene glycol (number average molecular weight: 1,000) and 0.015 part of niobic acid which had been heat-treated in advance at 150° C. for 10 hours, was heated under atmospheric pressure to maintain the internal temperature at 220° C. for 10 minutes and then vacuumized to 0.5 Torr or lower, as raising the temperature up to 250° C., whereunder a polycondensation reaction was conducted for 3 hours. The obtained polymer had an intrinsic viscosity of 1.21 and a crystalline melting point determined by DSC Method of 215° C. It was colorless and transparent. A dumbbell specimen 2 mm thick was tested in accordance with JIS K 6301. Then, the polymer exhibited a breaking strength of 330 kg/cm$^2$, an elongation at break of 750%, a brittle temperature of −70° C. and a surface hardness of 95. Further, as a solvent resistance test, the specimen was soaked in aliphatic and aromatic solvents such as gasoline, acetone, benzene and the like at room temperature, but no deformation of the specimen was observed.

COMPARATIVE EXAMPLE 10

Polymerization was conducted in the same manner as the above Example 29 except that tetra-n-butyl titanate was used instead of the niobic acid catalyst. The obtained polymer was white and opaque, having an intrinsic viscosity of 1.05.

EXAMPLES 30~37

The foregoing Example 29 was followed except that the niobic acid catalyst was heat-treated at different temperatures and added in different amounts. The results are shown in Table 7 below.

TABLE 7

| | Heat-treating temperature (°C.) | Amount of catalyst added (Nb wt. %) | Polymer Intrinsic Viscosity [η] | Appearance |
|---|---|---|---|---|
| Example 30 | 100 | 0.01 | 1.26 | Colorless, transparent |
| Example 31 | 200 | 0.01 | 1.35 | Colorless, transparent |
| Example 32 | 300 | 0.01 | 1.20 | Colorless, transparent |
| Example 33 | 150 | 0.001 | 0.85 | Colorless, transparent |
| Example 34 | 150 | 0.003 | 1.05 | Colorless, transparent |
| Example 35 | 150 | 0.02 | 1.36 | Colorless, transparent |
| Example 36 | 150 | 0.05 | 1.44 | Colorless, transparent |
| Example 37 | 150 | 0.1 | 1.51 | Pale yellow |

EXAMPLE 38

A reactor equipped with a fractionating column and a stirrer, charged with 166 parts of terephthalic acid and 75 parts of ethylene glycol, 120 parts of bis(hydroxyethyl)terephthalate, 100 parts of polytetramethylene glycol (number average molecular weight: 1,000) and 0.025 part of niobic acid which had been heat-treated in advance at 150° C. for 10 hours, was heated under atmospheric pressure to raise the internal temperature from 180° C. to 255° C. for 120 minutes to distil out the producing water. For the terephthalic acid to dissolve in the reaction liquid, another 2 hours and 50 minutes was required. The quantity of the distilled liquid was 33 parts. Then, raising the temperature up to 270° C., the reactor was vacuumized to 0.5 Torr within 1 hour, whereunder a polycondensation reaction was conducted for 2 hours. The obtained polymer had an intrinsic viscosity of 0.94. Its color shade was pale yellow and transparent. A dumbbell specimen 2 mm thick was tested in accordance with JIS K 6301. Then, the polymer exhibited a breaking strength of 760 kg/cm², an elongation at break of 430%, and a surface hardness of 96. Further, as a solvent resistance test, the specimen was soaked in solvents such as gasoline, acetone, benzene and the like at room temperature, but no deformation of the specimen was observed.

COMPARATIVE EXAMPLE 11

Polymerization was conducted in the same manner as the above Example 38 except that tetra-n-butyl titanate was used instead of the niobic acid catalyst. The time required for the terephthalic acid to dissolve was 3 hours and 20 minutes. The obtained polymer was white and opaque, having an intrinsic viscosity of 1.05. The quantity of the distilled liquid was 35 parts. The obtained polymer had an intrinsic viscosity of 0.682. Its shade was opaque and yellowish brown.

EXAMPLES 39~47

A polymerization reaction was conducted in the same manner as the foregoing Example 38, except that the niobic acid catalyst was heat-treated at different temperatures and added in different amounts. The results are shown in Table 8 below.

TABLE 8

| | Heat-treating Temperature (°C.) | Amount of catalyst added (Nb wt %) | Intrinsic Viscosity [η] | Appearance |
| --- | --- | --- | --- | --- |
| Example 39 | 100 | 0.01 | 0.91 | transparent, Pale yellow |
| Example 40 | 200 | 0.01 | 0.99 | transparent, Pale yellow |
| Example 41 | 300 | 0.01 | 0.89 | transparent, Pale yellow |
| Example 42 | 400 | 0.01 | 0.84 | transparent, Pale yellow |
| Example 43 | 150 | 0.001 | 0.75 | transparent, Pale yellow |
| Example 44 | 150 | 0.005 | 0.83 | transparent, Pale yellow |
| Example 45 | 150 | 0.02 | 0.98 | transparent, Pale yellow |
| Example 46 | 150 | 0.05 | 1.12 | Transparent, yellow |
| Example 47 | 150 | 0.1 | 1.33 | Transparent, yellow |

What is claimed is:

1. A process for producing a linear polyester comprising a main structural unit of an aromatic dicarboxylic acid ester of an alkylene glycol through polycondensation by a deglycol reaction of a bis alkylene glycol ester of the aromatic dicarboxylic acid, wherein a niobic acid obtained by heat-treating a hydrated niobium compound at the temperature range between 80° C. and 400° C. is used as a catalyst for the polycondensation.

2. A process as claimed in claim 1, wherein said aromatic dicarboxylic acid is terephthalic acid and said alkylene glycol is ethylene glycol.

3. A process as claimed in claim 1, wherein said hydrated niobium compound has been obtained by treating a niobium halide with an alkaline aqueous solution that contains not exceeding 45 mole % of ammonium hydroxide based on the total alkali components in the alkaline aqueous solution.

4. A process as claimed in claim 3, wherein said ammonium hydroxide is contained in the alkaline aqueous solution in an amount between 10 mole % and 40 mole % based on the total alkali components.

5. A process as claimed in claim 1, wherein said niobic acid catalyst is used in combination with phosphoric acid in a proportion defined by the following equation (I):

$$Nb/P = 0.1 \sim 10 \qquad (I)$$

wherein Nb is the weight of the niobic acid catalyst and P is the weight of the phosphoric acid.

6. A process as claimed in claim 1, wherein said aromatic dicarboxylic acid is terephthalic acid and said alkylene glycol is 1,4-tetramethylene glycol.

7. A process as claimed in claim 1, wherein said niobic acid catalyst is applied in such an amount that 0.0005~0.5% by weight of metallic niobium exists in the produced polyester.

8. A process as claimed in claim 1, wherein said niobic acid catalyst contains an effective component represented by the following chemical formula:

$$Nb_2O_5 \cdot xH_2O$$

wherein, $0 < x < 1$

9. A process as claimed in claim 1, wherein said polyester is an elastomeric polyester comprising a polyalkylene terephthalate as a hard segment and a polyalkylene glycol as a soft segment.

10. A process as claimed in claim 9, wherein said polyalkylene terephthalate is polyethylene terephthalate.

11. A process as claimed in claim 9, wherein said polyalkylene terephthalate is polytetramethylene terephthalate.

12. A process as claimed in claim 9, wherein said polyalkylene glycol is polytetramethylene glycol.

13. A process as claimed in claim 9, wherein said niobic acid catalyst is applied in such an amount that 0.0001~0.1% by weight of metallic niobium exists in the produced polyester.

14. A process as claimed in claim 9, wherein said niobic acid catalyst contains an effective component represented by the following chemical formula:

$$Nb_2O_5 \cdot xH_2O$$

wherein, $0 < x < 1$

15. A process for producing a linear polyester comprising a main structural unit of terephthalic acid ester of 1,4-tetramethylene glycol through a first reaction stage: esterification reaction of the terephthalic acid and the 1,4-tetramethylene glycol or transesterification reaction of a dialkyl ester of terephthalic acid and the 1,4-tetramethylene glycol to produce bis(hydroxytetramethyl)terephthalate; and a second reaction stage: polycondensation by a deglycol reaction of the bis(hydroxytetramethyl)terephthalate, wherein at least one organic metallic compound selected from the group consisting of organic titanium compounds and organic tin compounds is used as a catalyst for the esterification and a niobic acid obtained by heat-treating a hydrated niobium compound at the temperature range between 80° C. and 400° C. is used as a catalyst for the polycondensation.

* * * * *